United States Patent [19]

Shaffer, Jr.

[11] 4,161,657
[45] Jul. 17, 1979

[54] HYDROGEN SUPPLY AND UTILITY SYSTEMS AND COMPONENTS THEREOF

[76] Inventor: Marlin R. Shaffer, Jr., 1957 Hubbard Ave., Salt Lake City, Utah 84108

[21] Appl. No.: 885,584

[22] Filed: Mar. 13, 1978

Related U.S. Application Data

[63] Continuation of Ser. No. 551,763, Feb. 21, 1975, abandoned.

[51] Int. Cl.² ............................................. F03G 7/02
[52] U.S. Cl. .................................... 290/1 R; 60/641
[58] Field of Search ............... 290/1 R; 204/129, 278; 423/359; 60/641

[56] References Cited

U.S. PATENT DOCUMENTS

| | | | |
|---|---|---|---|
| 1,862,224 | 6/1932 | Langley | 204/278 |
| 2,036,613 | 4/1936 | Stuart | 290/1 R |
| 3,459,953 | 8/1969 | Hughes et al. | 204/129 X |
| 3,484,617 | 12/1969 | Winsel | 290/1 R |
| 3,928,145 | 12/1975 | Othmer | 60/641 X |
| 3,965,683 | 6/1976 | Dix | 60/641 |

FOREIGN PATENT DOCUMENTS

| | | | |
|---|---|---|---|
| 15031 | 5/1924 | Netherlands | 423/359 |
| 149556 | 8/1920 | United Kingdom | 204/278 |

*Primary Examiner*—Gene Z. Rubinson
*Assistant Examiner*—W. E. Duncanson, Jr.

[57] ABSTRACT

An energy system that is responsive to and converts radiant energy into direct current electricity at a pair of output connectors which are maintained at a potential difference. The hydrogen and oxygen-generating electrodes of an electrolysis cell are coupled to such terminals so that hydrogen and oxygen may be produced, with at least the former being stored under pressure. Valve or regulator means is supplied the hydrogen storage system such that, preferably, a constant volumetric output over a given time span is maintained for producing a useful result such as a continuous source of electrical energy. The valve means is regulated so that the gas pressure within the storage system is always maintained above a predetermined threshhold. Useful results are produced in the form of mechanical power, electrical power, the synthesizing of ammonia, and other important products and results. Where a hydrogen engine is employed in the system, then the vapor output is preferably fed back to the electrolysis cells of the system so that the water needed in the cell is continuously replenished. The system is designed such that the radiant energy, though intermittent or irregular, will generate a regulated source of essentially uniform electrical or mechanical energy or other useful, continuous product or result, as desired.

5 Claims, 10 Drawing Figures

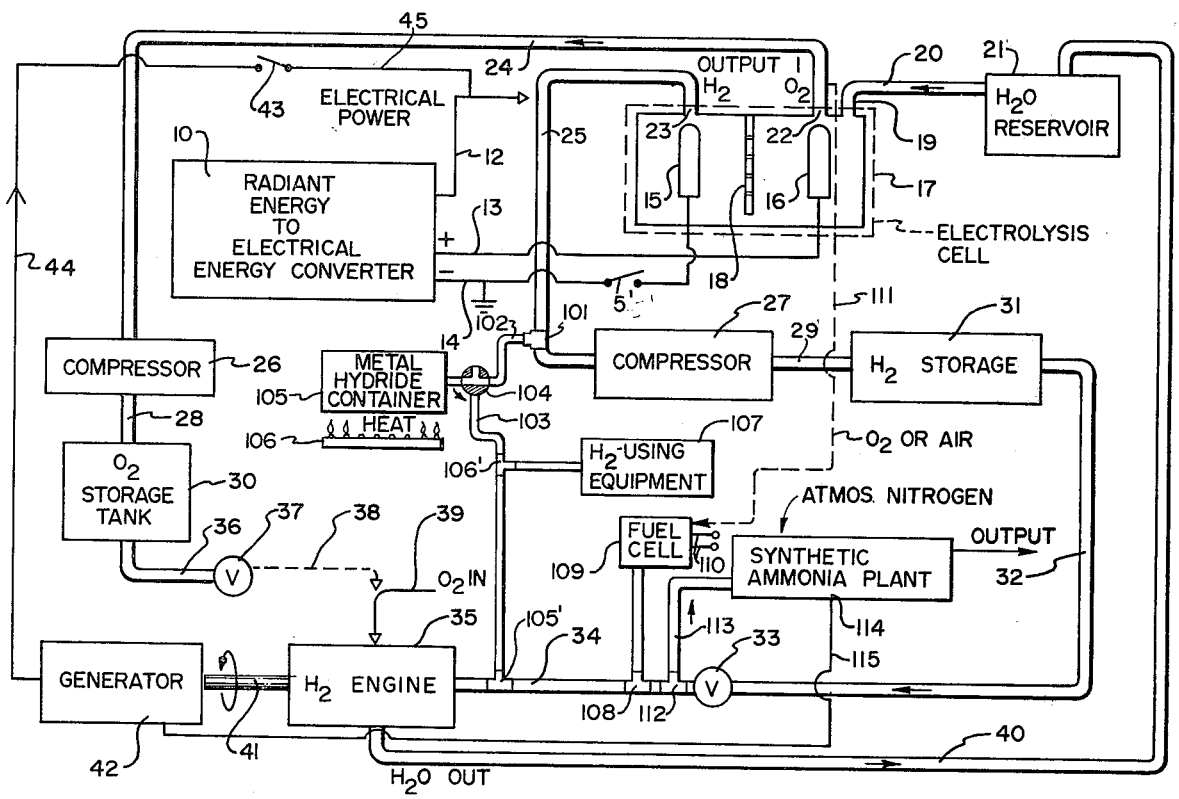
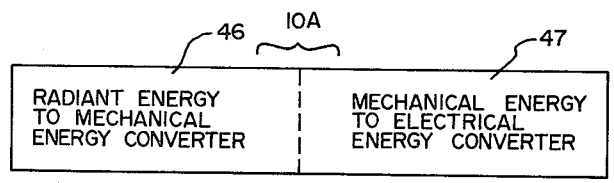
FIG. 3
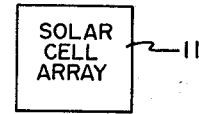
FIG. 2
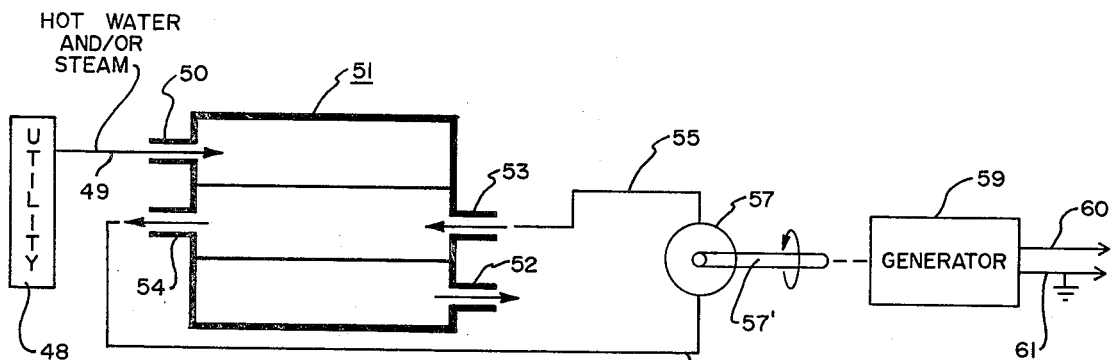
FIG. 4

HYDROGEN SUPPLY AND UTILITY SYSTEMS AND COMPONENTS THEREOF

This is a continuation, of application Ser. No. 551,763, filed Feb. 21, 1975 now abandoned.

The present invention relates to energy systems, and, more particularly, to a new and improved energy system incorporating the features of the production and storage under pressure of hydrogen, for a variety of uses and systems.

The term "radiation" as used herein is employed in its broadest sense to include radiant light and heat energies. This will include solar energy from the sun, or heat-exchanger employment with geothermal steam and utility power plant hot water and steam, and so forth.

Of primary but not exclusive importance, is the concept of solar energy and its utilization herein. Solar energy by its very nature is variable, and this not only because of the earth's seasons and the change in the angle of the incidence of light rays relative to the earth's surface, but also by virtue of changing weather conditions, dust, storms, and so forth. The intermittent nature of solar energy is a difficult problem with which to deal, particularly where dependable and continuous sources of energy and power are required.

In the present invention, means are provided to convert directly or step-by-step the radiant energy received into an electrical potential difference, which potential difference is applied across the electrodes of an electrolysis cell. The cell will contain pure water having as an electrolyte sodium hydroxide or potassium hydroxide, by way of example. These electrolytes are ideal because they are not destroyed nor need they be replenished during operation of the cell. The purpose for use of the electrolytic cell to produce hydrogen that can be maintained in a storage device for long periods of time. Thus, even though the electrolysis action may take place intermittently, yet the hydrogen can be used as fuel or other source so that a regulated supply of hydrogen in uniform flow can be routed to a hydrogen engine or to another device or process. The intermittent character of the radiant energy, therefore, has no effect on the regulated output desired.

In the radiant-energy to electrical-energy converter employed in the invention, a solar cell array is ideally suited. However, a two-step process may be included wherein radiant energy is first converted to mechanical energy, and then the mechanical energy is converted to electrical energy. The latter two-step system might include a heat engine and dynamo or generator combination, or similar apparatus.

With employment of the electrolytic cell and the resultant high volumetric supply of hydrogen produced, the hydrogen therefrom can be used to operate a fuel cell, to synthesize ammonia with atmospheric nitrogen under the Haber or other process, can be stored in super-cooled or metal-hydride tanks, and so forth.

Also contemplated is the use of geothermal or electric utility steam for operating a motor and generator combination of dynamo through a heat exchange network such that sufficient electricity will be produced from the radiant energy received for application to the electrodes of the electrolysis cell abovementioned.

Accordingly, a principal object of the present invention is to provide a new and improved radiant-energy responsive power and/or product system including hydrogen generation and usage.

A further object of the invention is to provide an electrical power system incorporating a shunt sub-system incorporating hydrogen generation, supply, and ignition so that supplemental electrical power can be generated and supplement the primary system as needed.

A further object is to provide a radiant-energy actuated hydrogen generation and supply system, permissably utilizing a heat engine, which is designed for continuous or semi-continuous usage, and storage, in a variety of industries and for a variety of uses.

A further object is to provide a closed electrolysis system wherein the exhaust products of a hydrogen engine associated therewith are returned to replenish the water supply of the electrolysis cell thereof.

A further object is to provide a regulated or uniform power system which is supplied by intermittent power.

A further object is to provide a hydrogen generation and storage system responsive to incoming radiant energy and provided with valve means such that hydrogen output in the system is maintained by requisite hydrogen storage.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a schematic of the basic system of the present invention in a preferred embodiment thereof and illustrating a number of uses.

FIG. 2 illustrates that a solar cell array may be employed of the radiant-energy to electrical-energy converter stage of FIG. 1.

FIG. 3 illustrates that the aforementioned converter may be a two-step system incorporating a radiant-energy to mechanical-energy converter substage coupled to a mechanical-energy to electrical-energy converter substage.

FIG. 4 is a schematic drawing illustrating the manner in which hot water and/or steam from a utility, from a geothermal cell or other means can be employed to drive a motor-generator unit for producing the electricity necessary for the electrolysis cell of FIG. 1, to thereby generate large hydrogen storage for subsequent use as a fuel, for continuous electrical generation, or for other uses.

Figures 5A, 5B, 5C:
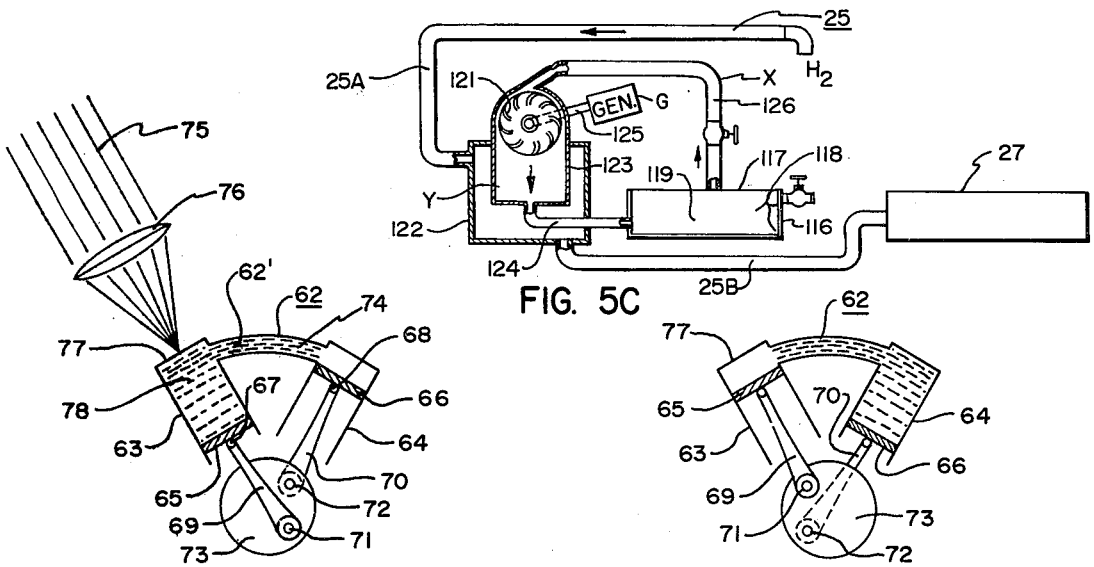
FIGS. 5A and 5B are schematic drawings of a representative heat engine of the Stirling type.
FIG. 5C is a diagrammatic presentation of another type of heat engine that can be employed for producing mechanical power as per the first stage of FIG. 3.

It is to be noted that recent developments in numerous arts which are related in the present invention make the combinations set forth both possible and practical.

In FIG. 1 a radiant-energy to electrical-energy converter 10 may take any one of several forms as will be hereinafter explained. In a system to be described, a highly unusual and efficient form of converter 10 will be a solar cell array 11 as seen in FIG. 2.

As to the solar cells, solar cell modules and arrays that may be utilized in the present invention at 10 and 11, the same are manufactured by many sources including the silicon solar cell modules known as HFSP-2-40, manufactured by the Centrelab Semiconductor Division of Globe Union Incorporated. Substantial reduction in the cost of silicon solar cells is at present very promising in the developments made by Tyco Laboratories, current efforts of which company are in the production of silicon ribbon. This is an edge-defined, film-fed growth (EFG) process which permits the growth of crystals in a shape desired, i.e., ribbons which can be readily converted into silicon wafers. Such developments promise to reduce the cost of silicon solar cells by a factor of from 10–25.

Converter 10 will supply primary electrical power via lead 12 and also auxiliary electrical power at leads 13 and 14 which are coupled to electrodes 15 and 16 of electrolysis cell 17. Electrolysis cell 17 may take any one of several forms and in the usual configuration will include a perforate baffle 18 disposed between the electrodes 15 and 16.

As to the electrolysis cells that can be utilized at 17 in FIG. 1, the most effective cells utilize an electrolyte of approximately 34% by weight of potassium hydroxide or 25% by weight of sodium hydroxide, this when the cell is operated at about 170° F. This heat can be supplied simply by the heat liberated during the electrolysis operation, so that such is sufficient to maintain the cell at a desired operating temperature. Two types of cells are employed and both are usable in the invention herein. These types are called the unipolar or tank-type cell, and also the bipolar or filter-press type. Diaphrams used as at partition 18 in FIG. 1 prevent the mixing of hydrogen and oxygen and are generally of asbestos cloth, wire screen, or perforated nickel plate. Typical examples of unipolar cells are the Knowles, Fausar and Burdett electrolytic cells. Closed tank unipolar cells include the International Oxygen Company and Consolidated Mining & Smelting Company tupe cells, by way of example. The cells above described operate at 100% current efficiency, but on the basis of energy consumption and work produced are about 70–80% efficient. Note, however, that on the basis of hydrogen and oxygen and per ampere hour delivered, these cells are practically 100% efficient.

Cell 17 can be open rather than closed, and hence may comprise an ocean, a lake, pond, or watercourse, and especially those of brackish waters or simply containing salts. Further, the water supplied "cell" 17 may be reconstituted water absorbed from the atmosphere by a silica gel or dessicant, evaporated and distilled therefrom.

Electrolysis cell 17 will include a water inlet port 19 to which inlet conduit 20, leading from water reservoir 21, is connected. Electrolysis cell ports 22 and 23 are respectively coupled by conduits 24 and 25 to compressors 26 and 27. Compressors 26 and 27 are each respectively coupled by conduits 28 and 29 to oxygen storage device 30 and hydrogen storage device 31, respectively.

Turning first to the hydrogen storage device 31, it is seen that conduit 32 leads therefrom through manually or otherwise actuatable valve 33, coupling therefrom to conduit 34 that serves as a hydrogen intake for hydrogen engine 35. It is important that device 31 supply a constant volume of gas per unit time even though hydrogen generation at cell 17 be intermittent. This can be accomplished, where device 31 is simply a pressure tank or cylinder, by using at 33 a self-regulated flow valve, such as a Racine flow valve, or by utilizing thereat a throttling-type regulator such as throttle regulators manufactured by the Maxitrol Company of Detroit, Michigan. Alternatively, device 31 may comprise a pair of series-coupled storage tanks, with a compressor interposed therebetween and responsive to final tank internal pressure for maintaining a constant pressure threshhold. Whatever structure is used, it is important that hydrogen outflow proximate tee 112 be essentially constant, even if hydrogen generation at cell 17 might be intermittent due to ambient conditions. All compressors herein can be supplied independent power sources, solar-powered or otherwise, or simply be coupled to generator 42 or leads 12, 14, for example.

Oxygen storage tank 30 may be provided with outlet conduit 36 and valve 37 for simply producing an oxygen supply for any one of several purposes but which also may be coupled by conduit 38 as an oxygen intake, in lieu of air, to hydrogen engine 35. Of course, oxygen may likewise be supplied by the ambient atmosphere or by other means as is shown by oxygen inlet 39. The combustion product, namely, water, is drained from the engine 35, is cooled, and is routed back to the reservoir 21 in a closed, water-replenishing system. Hydrogen engine 35 includes an output shaft 41 which is coupled to electrical generator 42. Engine-generator, motor-generator, and dynamo are to be understood to be interchangeable and equivalent. The output of electrical generator 42 may be coupled back to the electrical power circuit at 12 via switch 43 and leads 44 and 45 coupled thereto, as desired.

Rather than employing a solar cell array for example, as the converter 10, the converter may be itself formed of two stages such as a radiant-energy to mechanical-energy converter section 46 and a mechanical-energy to electrical-energy converter section or stage 47, both forming a converter 10A corresponding to converter 10 in FIG. 1. See FIG. 3 in this regard. The mechanical-energy to electrical-energy converter would take the form of the general direct current generator shown, for example, in FIGS. 4 and 6–8. The radiant-energy to mechanical-energy converter may take any one of several forms as is illustrated in FIGS. 4–7.

In returning to FIG. 1, it is seen that a tee 101 may be provided in conduit 25 to provide for the connection thereto of conduits 102 and 103 with three-way valve 104, used alternatively for charging container 105 and then for conducting hydrogen therefrom at desired times. This combination is connected to a metal hydride-containing container 105. By metal hydride is meant any metal which has the capacity to absorb hydrogen gas. A number of metals, metal alloys and mixtures are available. Palladium metal is one possible substance that will hold 800 volumes of hydrogen at room temperature and atmospheric pressure. The weight absorbed will increase with the pressure at which the system is operated. Metallic uranium will also absorb considerable quantities of hydrogen at room temperature and release it when elevated in temperature. Where a heat source is needed, the same may be supplied proximate the container 105 as at heat source 106 in FIG. 1. Line 103 is connected to conduit 34 via tee 105', supplied as needed. Line 103 may likewise be provided with a tee connection at 106' where the hydrogen received from the metal hydride within container 105 is delivered to a hydrogen utilizing equipment or unit at 107.

FIG. 1 also illustrates that a tee connection 108 leading to H-O fuel cell 109 may be provided for generating electricity at 110. Fuel cells of current design and operating on hydrogen as delivered by tee 108 may be from 40–70% efficient. The oxygen needed by the fuel cell can be supplied directly from line 24, as indicated by branch line 111 or may be simply supplied by the air.

A tee 112 may likewise be used with a conduit 113 coupling to a synthetic ammonia plant 114. These plants here will operate by use of distilled atmospheric nitrogen for example and compressed hydrogen as delivered by valve 33 and hydrogen storage device 31 but without the usual steam and fossil fuel or petroleum feedstocks otherwise necessary to produce the hydrogen required. There are many types of synthetic ammonia plants in existence utilizable at 114 and using many types of processes, known as, for example, the Haber process, the Haber-Bosch process, the Fauser process, the so-called NEC process, and so forth; plants utilizing one or more of these processes have been built by many companies including the Kellog Company, Nitrogen Engineering Corporation, also known as the Nitrogen Research Laboratory of the United States. Thus, both hydrogen and electric power may be supplied the ammonia plant 114 via electrical power lead 115 and the hydrogen proceeding by conduit 113 to the plant.

It is most important to note that ammonia, which is an important constituent of nitrogen fertilizer, is herein very inexpensively produced, this simply through the use of water, air, and radiant energy such as heat or the sun's rays, for producing by electrolysis both power and hydrogen to operate the plant.

By virtue of the solar-powered systems, for example, of the subject invention, hydrogen is generated extremely inexpensively. Herefore, use of hydrogen as a fuel has been extremely limited to certain special industrial purposes, this because of the great cost of producing hydrogen. In the past, the methods of producing commercially hydrogen favor the catalytic oxidation of carbon monoxide in blue-water gas. Low temperature fractionation of coal gas has also been used. These are expensive processes and require the presence of valuable hydrocarbons and fossil fuels. The present invention, in contrast, simply provides a usable fuel, namely hydrogen or ammonia, by the presence merely of water, air, and solar power, for example.

In FIG. 4, hot water and/or steam from a geothermal plant or from an electrical generating facility such as a nuclear power plant or hydrocarbon fuel type power plant as at 48 provides a hot water or steam residual output which is coupled by conduit 49 to input port 50 of heat exchanger 51. The super-heated water or steam passes through the heat exchanger and out exhaust port 52. Ports 53 and 54 are coupled by conduits 55 and 56 as indicated to a heat engine 57. The latter may comprise a steam engine, a vapor or gas engine, an ammonium engine, and so forth, at 57. In any event, there will be, for engine 57, a mechanical output shaft at 57' that can run generator 59 to produce electrical energy at 60 and 61. Accordingly, in FIG. 4 the energy from the hot water or steam of the electrical generating facility such as a public utility electrical power plant, for example, is utilized as to its super-heated water or steam to run a small stand-by, auxiliary, or shunt facility that can produce an additional electrical current suitable for coupling to the electrolysis cell 17 of FIG. 1.

The hydrogen produced in FIG. 1 is stored at 31 and then fuels at desired times engine 35 for supplying additional electrical energy at 44. Such a facility, excess electricity or power during off peak-load periods can be employed to generate hydrogen and, subsequently, additional electrical power to satisfy peak load added requirements, thereby reducing utility size and costs.

FIGS. 5A and 5B illustrate an optional type of radiant-energy to mechanical-energy converter in FIG. 3 as by what is known as a Stirling hot-air engine. See Stirling engine 62 in FIGS. 5A and 5B. The conventional Stirling engine is shown in diagrammatic form and includes cylinders 63 and 64 with pistons 65 and 66. Coupled to each piston by a pivot pin 67 and 68 is a swinging piston rod 69 and 70, respectively. Each of these piston rods are pinned at 71 and 72 to conventional flywheel 73. Cylinders 63 and 64 are intercoupled by conduit 74 of relatively small size which includes a heat-trapping steel-wool type gauze at 62'. The gauze is air pervious and yet tends to keep the heat entrapped within cylinder 63. Hot-air engines of the type shown in FIGS. 5A and 5B are quite efficient, noiseless and show considerable promise. The principle of operation is that the sun's rays at 75 are focused by a reflector or focus through a lens 76 to a translucent or transparent platic window 77 to heat the air or other fluid 78 within cylinder 63 above piston 65. The rapidly expanding air urges piston 65 downwardly and, by virtue of the flywheel 73, piston 66 upwardly. As the flywheel continues to turn it moves the second piston 66 downwardly and piston 65 upwardly, thereby forcing the hot air in a direction to the right through conduit 74 into cylinder 64 above piston 66. At this point the heat is exhausted in cylinder 64 and the sun's rays at 75 will operate to reheat again the volumetric air in cylinder 63 above piston 65. Steel wool gauze 62' is used to preheat the now-cooled air in cylinder 64 which returns to cylinder 63. The preheated air is expanded further as aforesaid by the light from the sun that heats the air above piston 65. It is noted that this is a thermal heat engine machine of a closed-system type.

In FIG. 5C a closed container 116 is employed which includes a transparent or translucent top 117 and also an inner side and bottom "black" layer 118. The tank 116 is filled, through the side valve shown, with one of the so-called true gasses or simply with an easily vaporized liquid such as ammonia dissolved in water.

The upper surface 117 is exposed to sunlight, heat, or other radiant energy source so as to vaporize or expand the working fluid 119 within the interior of container 116. The vapor or gas rises in conduit combination 126 to proceed to turbine 121. Jacket means 122 is disposed about hollow cylindrical structure 123 beneath the turbine, the latter being connected by conduit 124 back to container 116. The means 122, of increased volume, is used to cool the structure 123 and the working fluid used passing therethrough in the direction shown by the arrow by virtue of gas expansion in 122. Hence, this cooling may be ideally performed by the insertion of condenser or cooling unit 122 into hydrogen line 25, see FIG. 1, and shown here as line portions 25A and 25B. The portion 25B will again be connected directly to compressor 27, hydrogen thus serving as said working fluid.

In operation in FIG. 5C, the true gas is heated and expands or vapor such as ammonia from an ammonia water solution is vaporized upwardly such that the gaseous or vapor stream enters and moves turbine 121.

This vapor is cooled at structure 123 since there exits a heat exchange communication with the interior of structure 122. It is noted that structure 122 is an enlarged cavity leading to compressor 27. Accordingly, the hydrogen generated at the electrolysis cell 17 is utilized and expanded proximate structure 123 so as to cool this area and thereby supply a pressure gradient or differential as between the vapor pressure at X and the pressure at Y. This provides a turning of the turbine 121 so that the turbine may be used to supply mechanical, or electrical power at generator G in FIG. 5C via the revolving coupler shaft 125 which generator G may indeed comprise the mechanical-energy to electrical-energy converter 47 in FIG. 3. The shaft 125 may be adapted for manual revolvement until the system gets up to a speed sufficient to release the necessary hydrogen to cool the lower structure 123 and thereby supply the gaseous pressure gradient upon which revolving turbine 121 will rely.

FIG. 5C illustrates therefore, another form of prime mover for supplying energy such that the same may be coupled to electrodes 15 and 16 by virtue of leads 14 and 15 and the switch S' used.

Figure 6:
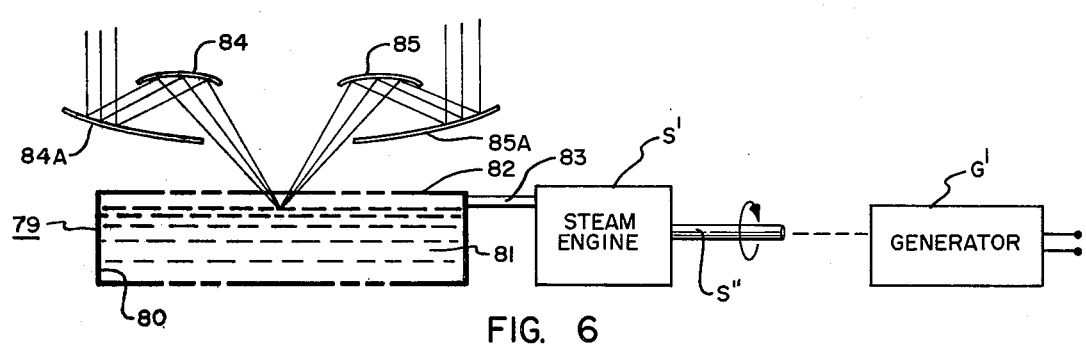
FIGS. 6, 7 and 8 are schematic diagrams principally in block form of fluid-included receptacles which are heated by the sun's rays for producing mechanical power and, ultimately, electrical power, and this whether by steam engine as in FIG. 6, by steam turbine as in FIG. 7, or by a gas system including a gas turbine as in FIG. 8.

Other means of producing mechanical power to supply electrical energy for electrodes 15, 16 of the cell 17 in FIG. 1 from radiation is shown in FIG. 6. Thus, a very large shallow vessel at 79 is supplied a black coating at 80 and is filled with water or other liquid or fluid at 81. A series of reflectors 84A, 85A, 84, and 85, are used to concentrate the sun's rays in a particular area. For convenience of illustration, the vessel has been expanded in a horizontal direction relative to the reflectors. Thus, the shallow pool may be many times smaller in dimension than the distance between the reflectors 84A and 85A. In any event, the sun's rays are concentrated on the darkened or black surface 80 to produce a low pressure steam within the vessel and beneath the transparent or translucent top 82 thereof. The steam is conducted by conduit 83 to a steam engine S' which produces mechanical output power at shaft S''. Shaft S'' may be coupled to electrical generator G' such that the latter may generate a DC current.

Figure 7:
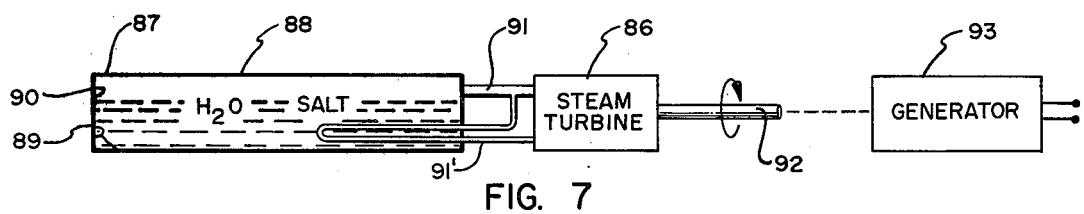

The structure in FIG. 7 is slightly different, this time including a steam turbine 86. Vessel 87 has a translucent top as of glass or plastic at 88 and includes on the sides and bottom thereof at 89 dark black coating 90. Disposed within the vessel in FIG. 7 is a water which is preferably brine laden such that the temperature of the water will rise appreciably and will remain hot for a substantial period of time. The steam generated, of from one to two atmospheres, is piped through conduit 91 into a conventional low-pressure operated steam turbine 86 for producing mechanical power at shaft 92 of the turbine. This shaft again powers DC generator 93. Alternatively, a hairpin configured conduit 91' can be immersed in the brine to supply circulating vapor pressure to turbine 86.

Figure 8:
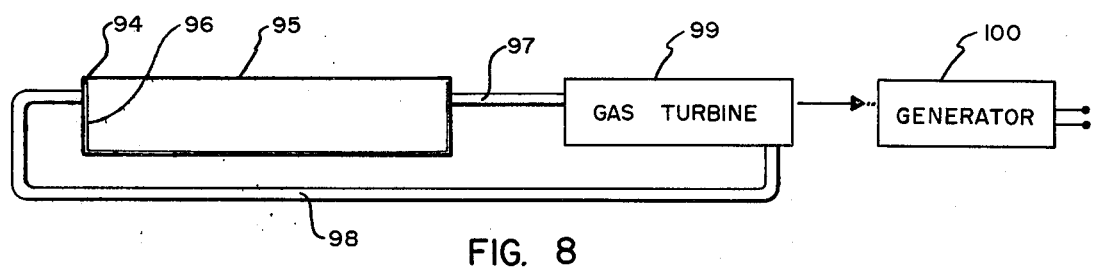

In FIG. 8 there is likewise a vessel at 94 having a translucent or transparent top surface made of glass or plastic as at 95. A darkened, painted or pitch surface 96 is provided. The vessel in FIG. 8 may be filled with any type of fluid, gas or liquid which is heated to a gaseous state by the sun's rays to revolve gas turbine. Thus, the vessel at 94 includes the fluid and the vessel was coupled by conduits 97 and 98 to gas turbine 99 of a low-pressure, low-temperature type. Accordingly, the sun's rays radiate downwardly upon translucent or transparent face 95 to heat the fluid disposed within the tank, and such gas is used to revolve the turbine 99 which, in turn, is coupled to and drives generator 100.

The terms "power" and "energy" as used herein shall be considered synonymous which shall include both electricity and heat, by way of example. Thus, unit 35 in FIG. 1 may comprise simply a furnace using oxidized hydrogen fuel which can be employed to serve as a supplementary heat source for heating or cooling solar heated homes and other buildings. The invention is usable in every context wherein hydrogen, or electricity, or heat produced therefrom, are to be employed as a continuous "power" source which will serve as a standby or auxiliary unit to supplement primary sources.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An electrical power system including, in combination: first structural means directly responsive to impingement thereon of the sun's rays for converting the sun's radiant energy in said rays as so received into electrical energy, said first means including a pair of opposite-polarity, electolysis, electrical connectors; second electrolysis means having water incorporating a salt-type electrolyte for generating hydrogen at a lower pressure and also oxygen, said second means having a pair of separated electrodes respectively coupled to said electrical connectors, a water inlet, and hydrogen and oxygen gas outlet ports respectively disposed cooperably with said electrodes; third means coupled to said hydrogen port and utilizing the hydrogen therefrom for producing a useful result; hydrogen storage means, including an electrically operated compressor, interposed between said second and third means, for storing hydrogen at a higher pressure, said hydrogen storage means being provided with means for regulating hydrogen flow from said hydrogen storage means to said third means for essentially uniform flow.

2. The combination of claim 1 wherein said first structural means comprises a solar cell array.

3. The combination of claim 1 wherein said first structural means comprises solar-heating-vessel for generating steam and a turbine-generator coupled thereto.

4. The combination of claim 1 wherein said first structural means comprises a solar heat engine, and electricity-generating means coupled thereto.

5. The combination of claim 1 wherein said third means has a water exhaust and includes water-flow conduit means coupled to said second electrolysis means whereby to route said water-exhaust from said third means back to said second electrolysis means to replenish the water supply thereof.

* * * * *